United States Patent [19]
Eastman et al.

[11] 3,849,021
[45] Nov. 19, 1974

[54] COMPRESSOR GEOMETRY CONTROL APPARATUS FOR GAS TURBINE ENGINE

[75] Inventors: James M. Eastman; Robert W. Schuster, both of South Bend, Ind.

[73] Assignee: The Bendix Corporation, South Bend, Ind.

[22] Filed: Apr. 2, 1973

[21] Appl. No.: 347,251

[52] U.S. Cl.................... 415/30, 415/17, 60/39.29
[51] Int. Cl...... F02c 9/14, F01d 17/06, F01d 19/00
[58] Field of Search......415/17, 30, 1, 13; 60/39.29

[56] References Cited
UNITED STATES PATENTS

| | | | |
|---|---|---|---|
| 2,850,226 | 1/1958 | Lundquist | 415/147 |
| 2,870,956 | 1/1959 | Dhonau et al. | 415/147 |
| 2,930,520 | 3/1960 | Abild | 60/39.29 |
| 2,978,166 | 4/1961 | Hahn | 415/17 |
| 3,166,989 | 1/1965 | Cowles et al. | 60/39.29 |
| 3,526,091 | 9/1970 | Schuster | 60/39.16 R |

*Primary Examiner*—William L. Freeh
*Assistant Examiner*—L. J. Casaregola
*Attorney, Agent, or Firm*—Gordon H. Chenez, William N. Antonis

[57] ABSTRACT

A fluid pressure responsive actuator responsive to first and second air pressures, at least one of which is compressor generated and varies as a function of engine speed, and connected to actuate compressor geometry varying means such as compressor pressurized air bleed means or compressor air inlet "flow fence or restriction" means thereby varying mass air flow through one or more of the compressor stages to avoid characteristic unstable operation of the compressor during an engine acceleration. A compressor bleed valve may be actuated to an open position in response to a predetermined ratio of the first and second air pressures during an engine acceleration to a selected speed and closed in proportion to a decreasing ratio of the first and second air pressures as the engine approaches the selected value. A compressor air inlet "flow fence or restriction" may be held in a closed position until a predetermined ratio of the first and second air pressures is reached and subsequently opened in proportion to an increasing ratio of the first and second air pressures to cause an increase in effective flow area of the compressor air inlet during an acceleration of the engine to a selected speed.

12 Claims, 7 Drawing Figures

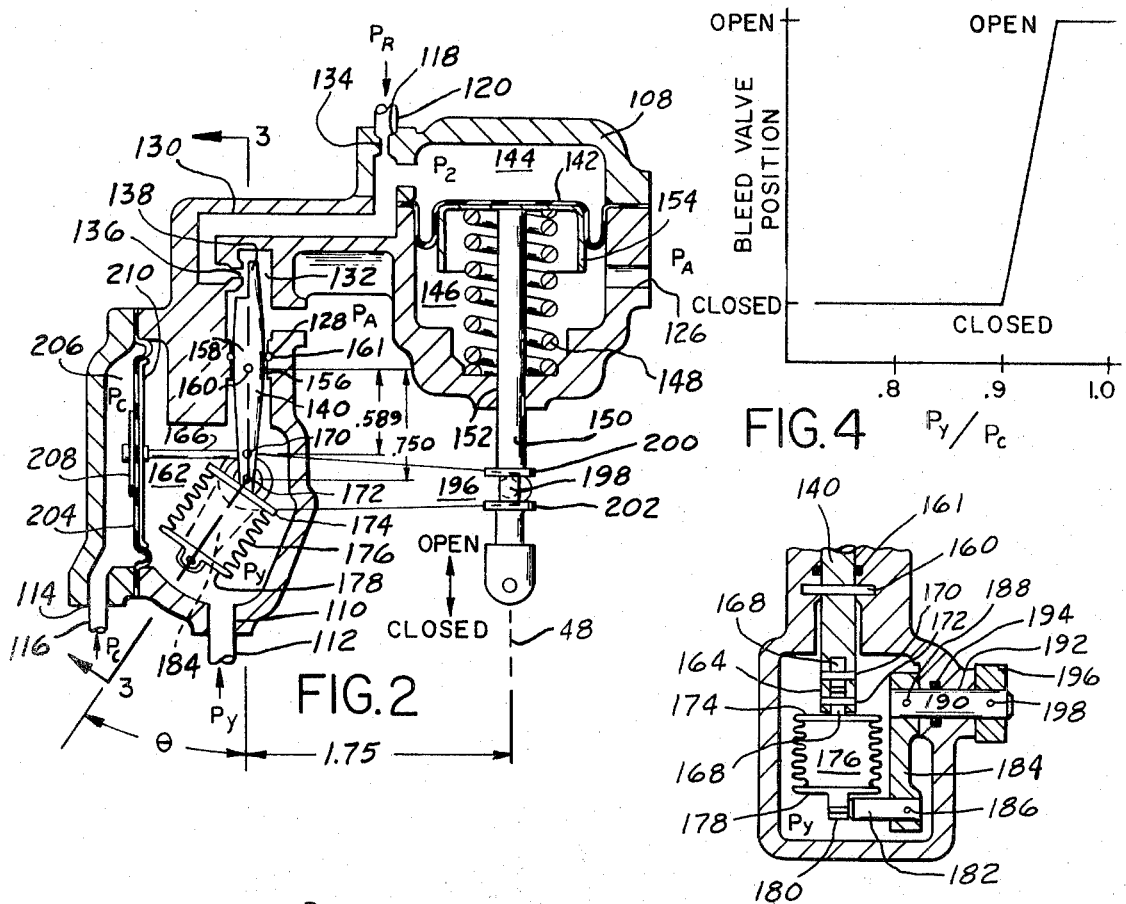
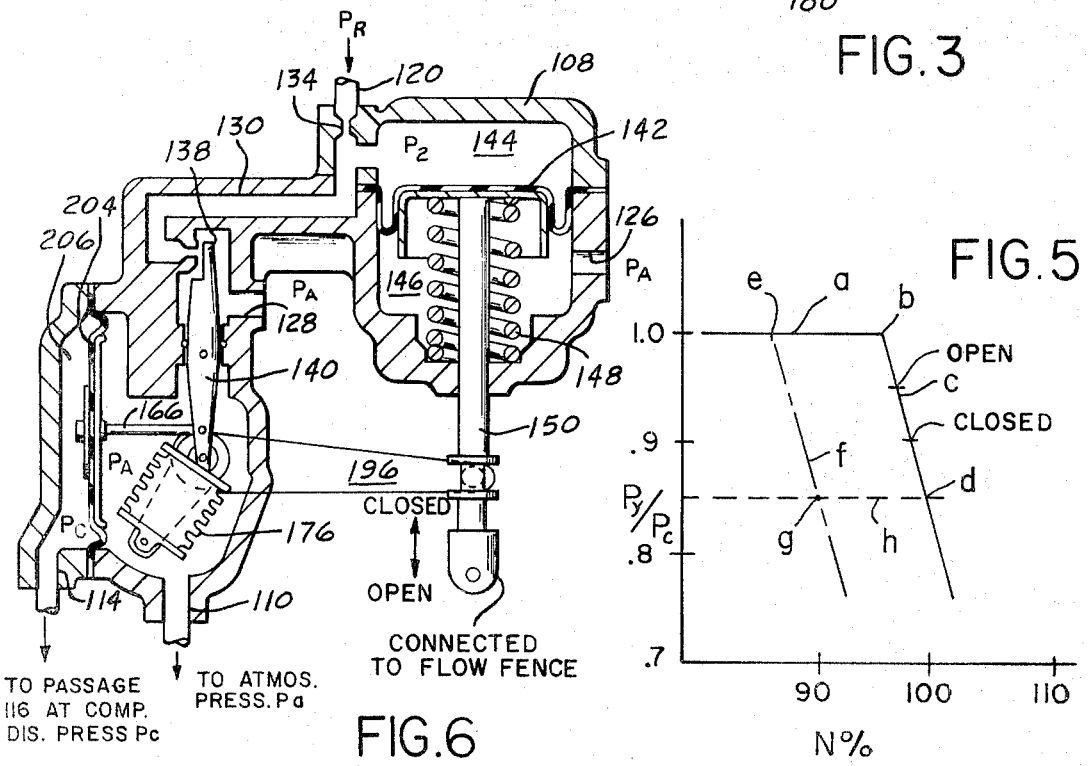

COMPRESSOR GEOMETRY CONTROL APPARATUS FOR GAS TURBINE ENGINE

BACKGROUND OF THE INVENTION

In a high performance axial flow compressor gas turbine engine, it is often necessary to control the mass air flow through the compressor to avoid characteristic unstable operation of the compressor particularly during an engine acceleration. Such control may be exercised by either of two conventional ways as, for example, by bleeding or venting compressor stages to a suitable relatively lower pressure drain source or by varying the effective flow area of the compressor inlet to increase or decrease the mass air flow to the compressor. It will be recognized that such bleeding of pressurized air or restriction of air flow to the compressor has an undesirable effect on the efficiency and power of the engine and therefore should be limited to a minimum during engine operation.

Various prior air compressor geometry varying means are known as, for example, that shown and described in U.S. Pat. No. 3,172,259 issued Mar. 9, 1965 to Howard L. North, Jr. and U.S. Pat. No. 3,646,753 issued Mar. 7, 1972 to Michael E. Coleman et al. The prior art actuators of which we are aware are adapted to actuate one or more bleed valves to a fully open or closed position in response to selected engine operating parameters which does not provide the variable degree of control over the bleed air flow from the compressor that applicants' actuator provides. It will be recognized that abrupt opening or closing of a compressor bleed valve or inlet "flow fence" may have an undesirable effect on compressor operation thereby rendering applicants' actuator advantageous in that gradual opening or closing of a bleed valve is established.

SUMMARY OF THE INVENTION

It is an object of the present invention to provide a gas turbine engine compressor geometry varying actuator responsive to a fluid pressure ratio which varies as a function of engine speed and adapted to control the degree of actuation in proportion to engine speed.

It is another object of the present invention to provide a gas turbine engine compressor bleed valve actuator which controls opening of a bleed valve in proportion to engine speed.

It is an additional object of the present invention to provide a gas turbine engine compressor inlet "flow fence" actuator which is responsive to a ratio of air pressures at least one of which pressures is a compressor generated air pressure variable as a function off engine speed.

Other objects and advantages of the present invention will be apparent from the following description and accompanying drawings.

BRIEF DESCRIPTION OF THE DRAWINGS

FIG. 2 is a schematic view in section of the present invention shown removed from the control system of FIG. 1;

FIG. 3 is a section view taken on line 3—3 of FIG. 2;

FIG. 4 is a curve or plot showing bleed valve position vs. pressure ratio $P_Y/P_C$;

FIG. 5 is a curve or plot showing the relationship between pressure ratio $P_Y/P_C$ and engine speed N.

FIG. 6 represents the structure of FIG. 2 modified for use in controlling a compressor inlet "flow fence."

DESCRIPTION OF THE PREFERRED EMBODIMENT

Figure 1:
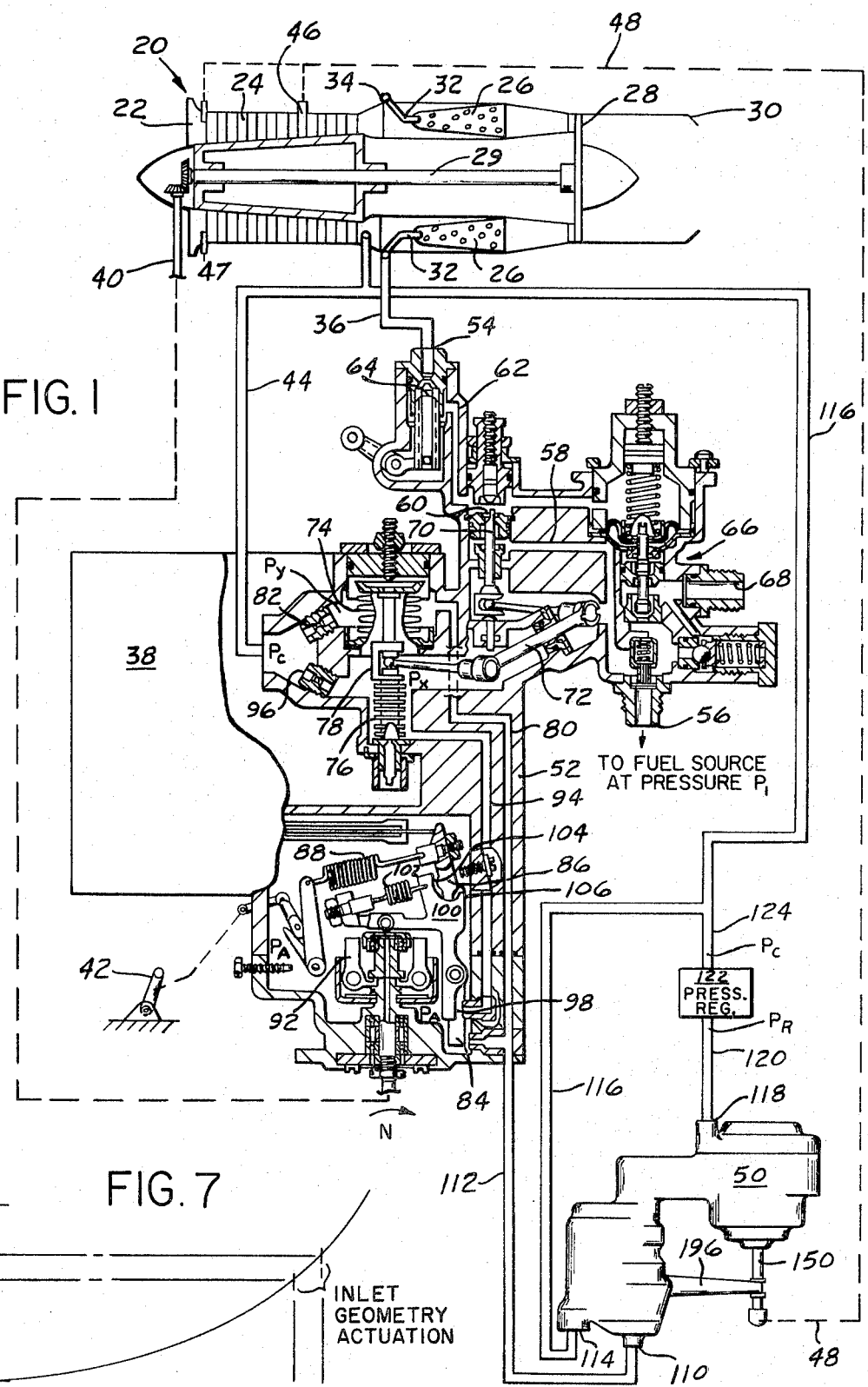
FIG. 1 is a schematic representation of a gas turbine engine and compressor bleed valve system therefor embodying the present invention.

Referring to FIG. 1, in particular, numeral 20 designates a conventional gas turbine engine provided with an air inlet 22 upstream from a multiple stage axial flow compressor 24 which discharges pressurized air flow to one or more combustion chambers 26. Hot motive gas generated in the combustion chamber 26 and discharged therefrom is passed through a gas turbine 28 connected to drive the compressor 24 via a shaft 29. The discharge gas from the gas turbine 28 is expelled through a discharge nozzle 30 thereby providing a propelling thrust.

A controlled rate of fuel flow is supplied to combustion chamber 26 via a fuel injection nozzle 32 supplied pressurized fuel by a fuel manifold 34 connected thereto and provided with a fuel supply conduit 36 leading from the outlet of a fuel control generally indicated by 38. The fuel control 38 is adapted to receive control input signals including engine rotational speed, N, via suitable gear and shafting 40, power request via a throttle lever 42 and compressor pressurized air at pressuree $P_C$ via a conduit 44 providing fluid communication between control 38 and the discharge section of compressor 24.

One or more conventional compressor air bleed valves 46 suitably connected to a selected stage or stages of the compressor 24 and adapted to vent compressor pressurized air therefrom to a suitable relatively low pressure drain source such as the atmosphere, $P_A$, is actuated by a linkage generally indicated by 48 and connected to bleed valve actuator 50.

The fuel control 38 is conventional and may be of any suitable type such as that shown and described in U.S. Pat. No. 3,526,091 issued to R. W. Schuster and having the same assignee as the present application. A portion of the control 38 is broken away to show the operating relationship between it and the bleed valve actuator 50. Reference is made to U.S. Pat. No. 3,526,091 for additional details of structure and operation of fuel control 38.

The fuel control 38 includes a casing 52 having an outlet 54 connected to conduit 36 and an inlet 56 connected to a source of pressurized fuel which may include a fuel tank and engine driven fuel pump, not shown.

Fuel passes from inlet 56 to outlet 54 via conduit means including passage 58, a variable area fuel metering orifice 60, passage 62 and fuel cut-off valve 64. Fuel bypass valve means generally indicated by 66 responsive to the fuel pressure differential across orifice 60 diverts fuel at unmetered fuel pressure $P_1$ to a fuel bypass outlet 68 which communicates with the inlet of the fuel pump, not shown,, to thereby maintain the pressure differential across orifice 60 at a predetermined constant value regardless of the effective flow area of orifice 60. A fuel metering valve 70 suitably connected to orifice 60 and movable relative thereto to vary the flow area of the same controls the rate of fuel flow therethrough.

The valve 70 is actuated by a linkage mechanism generally indicated by 72 which responds to a governor bellows 74 and a relatively smaller evacuated acceleration bellows 76 rigidly linked together by a stem 78. The bellows 74 is responsive to air pressures $P_Y$ and $P_X$ and evacuated bellows 76 is responsive to pressure $P_X$ which pressures $P_Y$ and $P_X$ derived from air at compressor discharge pressure $P_C$. A conduit 80 containing a fixed area restriction 82 communicates conduit 44 at compressor discharge air pressure $P_C$ with a relatively low pressure drain source $P_A$. The effective flow area of the discharge end of passage 80 is controlled by a flapper valve 84 actuated by a lever 86 which is force loaded by a governor spring 88 in response to movement of power request lever 42 and opposing governor centrifugal weight 92 driven by gear and shafting 40 in response to engine speed N. In this manner, the air pressure $P_Y$ intermediate restriction 82 and valve 84 to which the bellows 74 is responsive is caused to vary as a function of the error between a requested engine speed and actual engine speed, N. A conduit 94 containing a fixed area restriction 96 communicates conduit 44 at compressor discharge air pressure $P_C$ with the relatively low pressure drain source $P_A$. The effective flow area of the discharge end of passage 94 is controlled by a flapper valve 98 actuated by a lever 100 which is force loaded by a tension spring 102 connected to levers 100 and 86. The lever 100 is provided with spaced apart abutments 104 and 106 adapted to engage lever 86 thereby providing for a predetermined degree of movement of lever 100 relative to lever 86.

Referring to FIGS. 2 and 3, the bleed valve actuator 50 includes a casing 108 having a port 110 connected via a passage 112 to conduit 80 of fuel control 38 at pressure $P_Y$, a port 114 connected via a passage 116 and passage 44 to compressor discharge air at pressure $P_C$, a port 118 connected via a passage 120 to a source 122 of regulated air pressure $P_R$. The source 122 preferably includes a conventional fluid pressure regulator, not shown, adapted to receive compressor discharge air at pressure $P_C$ via a passage 124 and passage 116 and control the flow of same to maintain the flow of air to port 118 at predetermined constant pressure $P_R$. Ports 126 and 128 of casing 108 communicate the interior of casing 108 with atmospheric air pressure $P_A$. A passage 130 connecting port 118 with a chamber 132 vented to atmospheric pressure $P_A$ via a port 128 is provided with a fixed area restriction 134 and an outlet orifice 136. The effective flow area of the outlet orifice 136 is controlled by a flapper valve 138 mounted on a lever 140 thereby generating a variable control pressure $P_Z$ intermediate orifice 136 and restriction 134. A diaphragm 142 separates two chambers 144 and 146 which are vented to passage 130 at pressure $P_Z$ and port 126 at atmospheric pressure $P_A$, respectively. A compression spring 148 interposed between casing 108 and diaphragm 142 acts in opposition to the force derived from the pressure differential $P_Z$-$P_A$ acting on the exposed area of diaphragm 142. A rod 150 fixedly secured to one end to diaphragm 142 extends therefrom into sliding engagement with an opening 152 in casing 108 through which rod 150 extends into engagement with linkage 48. A stop member 154 suitably secured to diaphragm 142 is adapted to engage casing 108 to limit movement of diaphragm 142 under the influence of pressure $P_Z$.

The lever 140 extends through a circular opening 156 in casing 108 and is provided with a circular midportion 158 pivotally secured to casing 108 by a pin 160. An annular resilient seal such as O-ring 161 is suitably secured in the wall of opening 156 to provide a fluid seal against leakage through opening 156. The lever 140 extends into a chamber 162 and is provided with a slotted end 164 adapted to receive one end of a stem 166 and an arm 168 pivotally secured in spaced apart relationship to lever 140 by pins 170 and 172, respectively. The arm 168 is integral with an end cap 174 secured to one end of an evacuated bellows 176. The opposite end of evacuated bellows 176 is sealed by an end cap 178 having an integral arm 180 to which one end of a rod 182 is pivotally secured. The opposite end of rod 182 is fixed to one end of an arm 184 by a pin 186. The opposite end of arm 184 is fixed by a pin 188 to a shaft 190 rotatably mounted in an opening 192 in casing 108 and extending therethrough. A resilient seal such as O-ring 194 suitably secured in the wall of opening 192 provides a fluid seal against leakage through opening 192. A lever 196 is fixed at one end by a pin 198 to one end of shaft 190. The opposite end of lever 196 is provided with a follower member 198 slidably trapped between spaced apart annular shoulders 200 and 202 formed on rod 150.

A diaphragm 204 separates chamber 162 at pressure $P_Y$ from a chamber 206 vented to port 114 at pressure $P_C$ and is responsive to the pressure differential $P_C$-$P_Y$. The stem 166 is fixedly secured at one end to the diaphragm 204 by backing plates 208 and 210.

Reference may be made to the heretofore mentioned U.S. Pat. No. 3,526,091 for specific details of operation of the fuel control 38. However, for the present discussion it will be sufficient to recognize that the engine 20 is accelerated as a result of levers 86 and 100 being unbalanced in a direction to close flapper valves 84 and 98, respectively. The pressures $P_X$ and $P_Y$ increase accordingly to pressure $P_C$ thereby reducing the pressure differential $P_Y$-$P_X$ across governor bellows and pressurizing acceleration bellows 76 which, in turn, results in metering valve 64 moving in an opening direction as a function of compressor discharge pressure $P_C$ to increase fuel flow and cause the engine to accelerate accordingly.

As the engine approaches the selected engine speed corresponding to the position of lever 42, the spring 88 is overcome by weights 92 causing lever 86 to move thereby opening flapper valve 84, which, in turn, causes a reduction in pressure $P_Y$ allowing governor bellows 74 to expand in response to the increased $P_C$-$P_Y$ differential thereacross thereby urging metering valve 64 in a closing direction to reduce fuel flow causing the engine to accelerate at a reduced rate and stabilize at the selected speed. FIG. 5 illustrates the relationship of the ratio of pressures $P_Y$ and $P_C$ to engine speed N wherein line *a* represents engine acceleration, point *b* is a governor break, line *c* is a governor droop and point *d* is a selected engine speed of 100 percent. An acceleration to a lower selected speed *g* is similarly executed as indicated by governor break point *e* and droop *f*. It will be noted that the ratio $P_Y/P_C$ decreases from a value of 1.0 to some typical value such as approximately 0.85 designated by line *h* in the case of an acceleration to either selected speed. The decrease in $P_Y/P_C$ occurs only as the engine accelerates along the governor droop line $c$ or $f$ between points $b$, $d$ or $e$, $g$, respectively, to the respective selected speed $d$ or $g$ thereby rendering the pressure ratio $P_Y/P_C$ ideally suited as an input signal to bleed valve actuator 50 for controlling the bleed valve 46 as will be described.

The bleed valve 46 is actuated by diaphragm 142 in response to the pressure differential $P_2-P_A$ imposed on diaphragm 142. The pressure $P_R$ from which $P_2$ is derived is regulated to a fixed value above atmospheric pressure $P_A$ thereby compensating for the effect of pressure $P_A$ variations. The compression spring 148 is selected to provide a force which is balanced by a pressure differential $P_2-P_A$ acting on the exposed diaphragm 142 when the differential $P_2-P_A$ is equal to one half the pressure differential $P_R-P_A$. The flapper valve 138 in combination with restriction 134 provides a control over pressure $P_2$ which is equal to pressure $P_R$ when valve 138 is closed and proportional to pressure $P_R$ depending upon the effective area of open valve 138. The position of lever 140 and thus flapper valve 138 is determined by the opposing forces imposed thereon by diaphragm 204 and evacuated bellows 176 which forces are derived from the pressure differential $P_C-P_Y$ acting across the effective area, $A_D$, of diaphragm 204 and the pressure $P_Y$ acting on the effective area, $A_B$, of bellows 176 exposed thereto. For the purpose of the present discussion, it will be assumed that the forces derived from diaphragm 204 and bellows 176 are applied to lever 140 at lever arms of 0.750 and 0.589, respectively, from the pivot axis of lever 140 as indicated in FIG. 2. In such a case the force balance relationship of lever 140 may be defined by:

1. $0.589 A_D (P_C-P_Y) = 0.750 A_B P_Y \sin \theta$ wherein $\theta$ represents the beblows 176 swing angle between the longitudinal axis of lever 140 and longitudinal axis of bellows 176.

Equation 1 may be rewritten as:

2. $P_Y/P_C = 1/1 + 1.273 (A_B/A_D) \sin \theta$ wherein it will be noted that the pressure ratio $P_Y/P_C$ at which lever 140 is balanced is dependent upon the variable $\theta$.

By suitable selection of the length of lever 196 and area ratio $A_B/A_D$ the bleed valve 46 may be made to start closing at a predetermined pressure ratio $P_Y/P_C$ and fully close at a second predetermined ratio $P_Y/P_C$. To that end, it will be assumed that the effective length of lever 196 and area ratio $A_B/A_D$ are 1.75 inches and 0.1235 inch, respectively, such that the bleed valve is fully open above a pressure ratio $P_Y/P_C$ of approximately 0.90. In the range from 0.90 to 0.95 the bleed valve occupies a partially open position in proportion to the ratio $P_Y/P_C$ thereby avoiding abrupt closing of the bleed valve 46 which abrupt closing has an undesirable tendency to induce compressor surge.

An acceleration of the engine 20 is initiated by an increase in pressure $P_Y$ to pressure $P_C$ in the fuel control 38 in the heretofore mentioned manner. The resulting zero pressure differential across diaphragm 204 allows lever 140 to move in a direction to open valve 138 in response to the pressure $P_C$ acting against bellows 176. The resulting decrease in pressure $P_2$ permits spring 148 to bias diaphragm 204 into engagement with a suitable stop such as casing 108 thereby driving bleed valve 46 to open position. The lever 196 follows diaphragm 204 causing bellows 176 to pivot on pin 172 thereby reducing angle $\theta$ in response to which the bleed valve 46 remains open as the engine accelerates. Upon reaching governor break point $b$, the pressure $P_Y$ begins to decrease from $P_C$ as a result of the governor action of the fuel control 38 in the heretofore mentioned manner whereupon a $P_C-P_Y$ pressure differential is generated across diaphragm 204 with the resulting force imposed on lever 140 in opposition to the force derived from pressure $P_Y$ acting against bellows 176. Upon reaching the aforementioned predetermined pressure ratio $P_Y/P_C$ of .95, the lever 140 becomes unbalanced in a direction to close valve 138 causing a corresponding rise in pressure $P_2$ and movement of diaphragm 142 against spring 148 which, in turn, causes bleed valve 46 to close in proportion to the decreasing ratio of pressures $P_Y/P_C$. At the aforementioned predetermined pressure ratio of 0.90, the diaphragm 142 has moved to the extent that bleed valve 46 is closed and stop member 154 is engaged with casing 108. As the bellows 176 swing angle $\theta$ increases in response to movement of diaphragm 142 and thus lever 196, the force component of bellows 176 opposing diaphragm 142 increases accordingly thereby tending to balance lever 140. In general, the angle $\theta$ varies from approximately 20° to 45°. The bleed valve 46 remains closed as the engine continues accelerating along the governor droop line $c$ to the selected speed point $d$. The above-mentioned control of bleed valve 46 in response to the decreasing pressure ratio $P_Y/P_C$ is represented by FIG. 4. It will be noted that the bleed valve 46 is fully open only in the $P_Y/P_C$ pressure ratio range of 0.95 to 1.0.

Referring to FIG. 6, there is shown the structure of FIG. 2 modified for use in controlling a conventional compressor inlet "flow fence," as shown in FIG. 1. As shown 47 the output rod 150 is suitably connected to actuate the flow fence. The chambers 162 and 206 are vented to atmospheric air pressure $P_A$ and compressor discharge air pressure $P_C$, respectively, thereby subjecting the diaphragm 204 to the air pressure differential $P_C-P_A$ and bellows 176 to atmospheric air pressure $P_A$. It will be noted that the position of output rod 150 is designated by arrows indicating closed and open which closed and open positions correspond to minimum and maximum areas, respectively, of the compressor inlet area established by the flow fence, It will be assumed that the engine 20 is stable in operation at a relatively low engine speed as, for example, engine idle. An engine acceleration to maximum or 100 percent engine speed is initiated in the heretofore mentioned manner with regard to FIG. 2. At engine idle, the lever 140 is balanced by the force derived from $P_C-P_A$ acting across diaphragm 204 and opposing force derived from $P_A$ acting against bellows 176 which results in valve 138 occupying an open position whereby pressure $P_2$ is reduced permitting spring 148 to actuate diaphragm against casing 108 which corresponds to a closed position of the flow fence.

Figure 7:
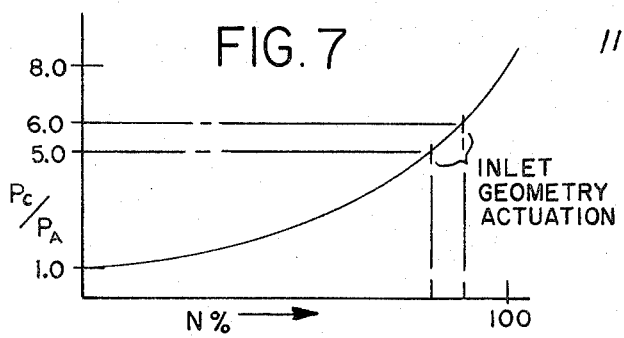
FIG. 7 is a curve or plot showing flow fence position vs. pressure ratio $P_C/P_A$.

As the engine accelerates, compressor discharge air pressure $P_C$ increases resulting in an increase in compressor pressure ratio $P_C/P_A$ as a function of engine speed as indicated in FIG. 7. Upon reaching a first predetermined pressure ratio $P_C/P_A$ of 5, for example, and an engine speed corresponding thereto, the force derived from pressure differential $P_C-P_A$ acting across diaphragm 204 overcomes the opposing force component of bellows 176 which occupies a predetermined angular position, $\theta$, of approximately 68° relative to lever 140. The resulting unbalance effect on lever 140 moves valve 138 in a closing direction resulting in an increase in pressure $P_2$ and movement of diaphragm 142 against spring 148 thereby actuating the flow fence, not shown, connected thereto in an opening direction to increase the effective inlet flow area of compressor 24. The movement of diaphragm 142 is transmitted via rod 150 to lever 196 which swings bellows 176 thereby increasing the angle $\theta$ which, in turn, increases the force component of bellows 176 opposing diaphragm 204 thereby tending to generate a force balance on lever 140. In this manner, the movement of diaphragm 142 and thus flow fence connected thereto is made proportional to the increasing pressure ratio $P_C/P_A$. Upon reaching a second pressure ratio $P_C/P_A$ of 6, for example, corresponding to a higher engine speed, the diaphragm 142 has moved to a position where the flow fence is fully open to maximize the effective inlet area of compressor 24 and bellows 176 is positioned at an angle $\theta$ of approximately 80°. The stop 154 engages casing 108 to prevent further movement of the diaphragm 142 as the engine 20 continues to accelerate to the selected maximum speed.

An engine deceleration from the maximum speed to the idle speed results in reversal of the above-mentioned operation. It will be understood that the flow fence is fully closed in the engine speed operating range below the above-mentioned first predetermined pressure ratio $P_C/P_A$ of 5 and fully open in the engine speed operating range above the above-mentioned second predetermined pressure ratio $P_C/P_A$ of 6. In the speed range between the first and second predetermined pressure ratio $P_C/P_A$ of 5 and 6, the diaphragm 142 and thus flow fence is positioned intermediate the open and closed position in proportion to the pressure ratio $P_C/P_A$.

The above-mentioned specific values assigned to the various lever arms and area ratio of diaphragm 204 and bellows 176 are representative only and may be suitably changed to vary the relationship between movement of bleed valve 46 and pressure ratio $P_Y/P_C$ or flow fence position and pressure ratio $P_C/P_A$ depending upon the characteristics of a given engine as will be recognized by those persons skilled in the art.

We claim:

1. Control apparatus for a gas turbine engine having a variable geometry air compressor comprising:
 a fluid pressure responsive output member operatively connected to said air compressor for varying the geometry thereof;
 valve means for controlling the fluid pressure to which said pressure responsive member responds;
 control means responsive to first and second air pressures at least one of which varies in a predetermined manner in response to engine speed, said control means having a lever member operatively connected to said valve means for actuating the same in proportion to the ratio of said first and second air pressures over a predetermined range of engine speeds during an acceleration of the engine to a selected speed;
 said control means having a first air pressure responsive member operatively connected to said lever member and responsive to said first and second air pressures, and a second air pressure responsive member operatively connected to said lever member and responsive to said second air pressure for loading said lever member in opposition to said first air pressure responsive member; and
 means operatively connecting said fluid pressure responsive output member and said second air pressure responsive member for positioning said second air pressure responsive member in response to movement of said output member to vary the effective force component of said second air pressure responsive member opposing said first air pressure responsive member.

2. Control apparatus for a gas turbine engine having a variable geometry air compressor comprising:
 output means operatively connected to said air compressor for varying the geometry thereof in response to a fluid pressure;
 valve means for controlling said fluid pressure in response to an operational condition;
 control means responsive to a first air pressure and a second air pressure one of which varies as a function of engine speed for actuating said valve means in proportion to the ratio of said first air pressure and said second air pressure over a predetermined range of engine speeds during an acceleration of the engine to a selected speed;
 lever means operatively connecting said control means with said valve means;
 first pressure means responsive to said first air pressure and said second air pressure for supplying said lever means with an operational signal;
 second pressure means responsive to said second air pressure for supplying said lever means with a loading force in opposition to said first pressure means; and
 linkage means for connecting said output means and said second pressure means for varying a component of the loading force as a function of engine speed.

3. Control apparatus for a gas turbine engine having a variable geometry air compressor as claimed in claim 1 wherein:
 said one air pressure which varies with engine speed is compressor discharge air pressure.

4. Control apparatus for a gas turbine engine having a variable geometry air compressor as claimed in claim 1, wherein:
 said first air pressure is compressor discharge air pressure; and
 said second air pressure is derived from compressor discharge air pressure and modified by engine speed responsive means over said preetermined range of engine speeds.

5. Control apparatus for a gas turbine engine having a variable geometry air compressor as claimed in claim 1, wherein:
 said first air pressure responsive member is a diaphragm exposed to said first and second air pressures and responsive to the differential therebetween;
 said second air pressure responsive member is an evacuated bellows pivotally mounted at one end to said lever member and at its opposite end to said output member;
 said evacuated bellows being actuated angularly relative to said lever member by said output member to vary the effective force component thereof directed against said lever member in opposition to said diaphragm.

6. Control apparatus for a gas turbine engine having a variable geometry air compressor as claimed in claim 1, wherein:
said variable geometry is defined by a compressor air bleed valve, said control apparatus further including;
engine governor means having a characteristic governor droop range of operation for controlling engine operation;
said control means operatively connected to said compressor bleed valve for actuating the same to an open position in response to a first predetermined ratio of said first and second air pressures during an acceleration of said engine to a selected speed;
said control means actuating said bleed valve to close the same proportionally with a decrease in said ratio of said first and second air pressures over a predetermined range of engine speed within said governor droop range of operation 7. Control apparatus for a gas turbine engine having a variable geometry air compressor as claimed in claim 6, wherein:
said second air pressure is controlled by said governor means in response to engine speed.

8. Control apparatus for a gas turbine engine having a variable geometry air compressor as claimed in claim 5, wherein:
said diaphragm and bellows have a predetermined fixed area ratio.

9. Control apparatus for a gas turbine engine having a variable geometry air compressor as claimed in claim 1, wherein:
said first and second air pressures are upon closure of a flapper valve means equalized to establish said first predetermined ratio.

10. Control apparatus for a gas turbine engine having a variable geometry air compressor as claimed in claim 1, wherein:
said second air pressure responsive member is an evacuated bellows pivotally connected at one end to said lever means and at the opposite end to a swinging arm adapted to swing said bellows about said pivot connection with said lever member; and lever means operatively connected to said output member and said swinging arm for actuating said arm in response to movement of said output member.

11. Control apparatus for a gas turbine engine having a variable geometry air compressor as claimed in claim 1, wherein said variable geometry is defined by a compressor inlet flow fence and wherein:
said fluid pressure responsive output member is operatively connected to said flow fence for actuating the same;
said first and second air pressures are atmospheric and compressor discharge air pressures, respectively.

12. Control apparatus for a gas tubine engine having a variable geometry air compressor as claimed in claim 11, wherein:
said inlet flow fence is operatively connected to said fluid pressure response output member by a linkage means, said inlet flow fence is actuated to a fully closed position in response to a said ratio of first and second air pressures below a first predetermined ratio thereof and a fully open position in response to said ratio of first and second air pressures above a second predetermined ratio thereof;

said inlet flow fence is actuated in an opening direction in proportion to said ratio of first and second air pressures as said ratio increases from said first to said second predetermined ratio.

* * * * *